(12) United States Patent
Schiffhauer et al.

(10) Patent No.: US 9,046,087 B2
(45) Date of Patent: Jun. 2, 2015

(54) MOTOR PUMP UNIT

(75) Inventors: Walter Schiffhauer, Leutenbach (DE); Lanfranco Pol, Quistello Mn (IT)

(73) Assignee: Alfred Kaercher GmbH & Co. KG, Winnenden (DE)

(*) Notice: Subject to any disclaimer, the term of this patent is extended or adjusted under 35 U.S.C. 154(b) by 0 days.

(21) Appl. No.: 13/136,668

(22) Filed: Aug. 4, 2011

(65) Prior Publication Data

US 2012/0034111 A1 Feb. 9, 2012

Related U.S. Application Data

(63) Continuation of application No. PCT/EP2010/051100, filed on Jan. 29, 2010.

(30) Foreign Application Priority Data

Feb. 13, 2009 (DE) .......................... 10 2009 010 461

(51) Int. Cl.
*F04B 39/06* (2006.01)
*F04B 17/03* (2006.01)
(Continued)

(52) U.S. Cl.
CPC ............... *F04B 17/03* (2013.01); *F04C 29/045* (2013.01); *B08B 3/026* (2013.01);
(Continued)

(58) Field of Classification Search
CPC ... E21B 43/127; F04C 29/045; F04D 25/082; F04D 29/5806; F04D 29/586
USPC ............. 417/371, 366, 357, 367, 368; 310/54
See application file for complete search history.

(56) References Cited

U.S. PATENT DOCUMENTS

| 1,431,907 A | 10/1922 | Cramer |
| 1,614,091 A | 1/1927 | Van Toff |

(Continued)

FOREIGN PATENT DOCUMENTS

| DE | 926 676 | 4/1955 |
| DE | 27 16 184 | 10/1977 |

(Continued)

OTHER PUBLICATIONS

Patent Abstracts of Japan, Abstract of Japanese Patent "Scroll-Type Fluid Machine", Publication No. 61250393, Nov. 7, 1986, Japanese Application No. 60091533, Filed Apr. 26, 1985.
Patent Abstracts of Japan, Abstract of Japan Patent "Scroll Type Hydraulic Unit", Publication No. 02196182, Aug. 2, 1990, Japanese Application No. 01015979, Filed Jan. 24, 1989.
Patent Abstracts of Japan, Abstract of Japanese Patent "Scroll Compressor", Publication No. 10220382, Aug. 18, 1998, Japanese Application No. 09022829, Filed Feb. 5, 1997.

*Primary Examiner* — Alexander Comley
(74) *Attorney, Agent, or Firm* — Lipsitz & McAllister, LLC

(57) ABSTRACT

A motor pump unit for a high-pressure cleaning apparatus has an electric motor and a pump. The electric motor has a motor housing that is surrounded by a cooling housing with an annular space having an annular space inlet and an annular space outlet formed therebetween. The pump has a suction inlet connected to the annular space outlet and a pressure outlet. The liquid to be transported by the pump can be supplied to the annular space inlet. In order to improve the motor pump unit such that the motor housing can have a small wall thickness and can still be cooled effectively over a large surface area, the motor housing is configured as a one-piece deep-drawn part which in a front shell area contacts stator laminations of the electric motor and in a rear shell area is arranged at a distance from rear coil heads of the stator and in the rear shell area has stiffness-enhancing depressions, wherein the front and the rear shell areas are surrounded by the annular space.

6 Claims, 3 Drawing Sheets

(51) Int. Cl.
  *B08B 3/02*      (2006.01)
  *F04B 53/08*     (2006.01)
  *H02K 5/173*     (2006.01)
  *H02K 5/20*      (2006.01)
  *F04C 29/04*         (2006.01)
  *H02K 5/10*          (2006.01)
  *H02K 5/15*          (2006.01)
  *H02K 7/14*          (2006.01)

(52) U.S. Cl.
  CPC .. *B08B 2203/0223* (2013.01); *B08B 2203/027* (2013.01); *B08B 2203/0294* (2013.01); *F04B 39/064* (2013.01); *F04B 53/08* (2013.01); *H02K 5/10* (2013.01); *H02K 5/15* (2013.01); *H02K 5/1732* (2013.01); *H02K 5/20* (2013.01); *H02K 7/14* (2013.01)

(56) References Cited

U.S. PATENT DOCUMENTS

| | | |
|---|---|---|
| 2,037,245 A | 4/1936 | Leifheit et al. |
| 2,301,063 A | 11/1942 | McConaghy |
| 2,734,459 A | 2/1956 | Zimsky |
| 2,763,214 A * | 9/1956 | White ............... 417/357 |
| 2,782,720 A | 2/1957 | Dochterman |
| 2,784,672 A | 3/1957 | Wallace |
| 2,854,595 A | 9/1958 | Arutunoff |
| 2,913,988 A * | 11/1959 | White ............... 417/357 |
| 2,914,253 A | 11/1959 | Jobus et al. |
| 2,993,449 A | 7/1961 | Harland |
| 3,135,213 A | 6/1964 | Smith et al. |
| 3,371,613 A | 3/1968 | Dahlgren et al. |
| 3,426,691 A | 2/1969 | Anderson |
| 3,434,656 A | 3/1969 | Bellmer |
| 3,525,001 A * | 8/1970 | Erickson ............ 310/54 |
| 3,667,870 A | 6/1972 | Yoshida et al. |
| 3,738,781 A | 6/1973 | Hagemann et al. |
| 3,744,935 A | 7/1973 | Magni |
| 3,992,133 A | 11/1976 | Brunner |
| 4,480,967 A * | 11/1984 | Schulze ............ 417/368 |
| 4,516,044 A | 5/1985 | Bone |
| 4,648,809 A | 3/1987 | Gensberger |
| 4,700,092 A | 10/1987 | Bincoletto |
| 4,808,087 A | 2/1989 | Tsutsui et al. |
| 4,844,701 A | 7/1989 | Wolford et al. |
| 4,878,804 A | 11/1989 | Akerman et al. |
| 4,922,148 A | 5/1990 | Kitamura |
| 4,934,914 A | 6/1990 | Kobayashi et al. |
| 4,958,988 A | 9/1990 | Regev |
| 5,040,950 A | 8/1991 | Dalquist, III et al. |
| 5,113,103 A * | 5/1992 | Blum et al. ......... 310/89 |
| 5,145,335 A | 9/1992 | Abelen et al. |
| 5,174,730 A | 12/1992 | Nieuwkamp et al. |
| 5,240,391 A | 8/1993 | Ramshankar et al. |
| 5,250,863 A | 10/1993 | Brandt |
| 5,283,915 A | 2/1994 | Idland et al. |
| 5,293,089 A | 3/1994 | Frister |
| 5,326,235 A * | 7/1994 | Bruhn ............... 417/410.1 |
| 5,332,369 A | 7/1994 | Jensen |
| 5,349,147 A | 9/1994 | Gallone |
| 5,350,281 A | 9/1994 | Hagshenas |
| 5,354,182 A * | 10/1994 | Niemiec et al. ...... 417/363 |
| 5,363,674 A | 11/1994 | Powell |
| 5,388,970 A | 2/1995 | Muckelmann et al. |
| 5,395,214 A | 3/1995 | Kawahara et al. |
| 5,533,875 A | 7/1996 | Crum et al. |
| 5,616,973 A * | 4/1997 | Khazanov et al. ...... 310/54 |
| 5,772,411 A | 6/1998 | Crum et al. |
| 5,930,852 A | 8/1999 | Gravatt et al. |
| 5,938,389 A | 8/1999 | Shore et al. |
| 5,997,261 A | 12/1999 | Kershaw et al. |
| 6,000,917 A | 12/1999 | Smerud et al. |
| 6,017,204 A | 1/2000 | Holzapfel et al. |
| 6,068,459 A | 5/2000 | Clarke et al. |
| 6,074,141 A | 6/2000 | Ishikawa et al. |
| 6,074,185 A | 6/2000 | Protos |
| 6,132,183 A | 10/2000 | Li et al. |
| 6,146,113 A | 11/2000 | Fassnacht et al. |
| 6,175,173 B1 | 1/2001 | Stephan et al. |
| 6,191,511 B1 | 2/2001 | Zysset |
| 6,300,693 B1 | 10/2001 | Poag et al. |
| 6,322,332 B1 | 11/2001 | Jensen et al. |
| 6,398,530 B1 | 6/2002 | Hasemann |
| 6,439,861 B1 | 8/2002 | Shieh |
| 6,814,551 B2 | 11/2004 | Kammhoff et al. |
| 6,871,512 B2 | 3/2005 | Tsunoda |
| 7,005,765 B1 | 2/2006 | Schulz et al. |
| 7,063,519 B2 | 6/2006 | Agrawal et al. |
| 7,182,583 B2 | 2/2007 | Gandrud et al. |
| 7,591,147 B2 | 9/2009 | Masoudipour et al. |
| 8,147,216 B2 | 4/2012 | Schiffhauer et al. |
| 2003/0031570 A1 | 2/2003 | Kammhoff et al. |
| 2005/0175479 A1 | 8/2005 | Gandrud et al. |
| 2010/0047091 A1 * | 2/2010 | Schiffhauer et al. ....... 417/410.1 |

FOREIGN PATENT DOCUMENTS

| | | | |
|---|---|---|---|
| DE | 29 20 883 | 12/1980 | |
| DE | 81 11 792 | 8/1981 | |
| DE | 30 17 117 | 11/1981 | |
| DE | 35 45 665 | 7/1987 | |
| DE | 85 36 175 | 7/1987 | |
| DE | 8536175 U1 * | 7/1987 | |
| DE | 36 03 423 | 8/1987 | |
| DE | 3603423 A1 * | 8/1987 | .............. H02K 9/00 |
| DE | 37 38 592 | 5/1989 | |
| DE | 38 17 641 | 11/1989 | |
| DE | 41 05 349 | 8/1992 | |
| DE | 94 17 662 | 2/1995 | |
| DE | 196 04 447 | 2/1997 | |
| DE | 196 52 706 | 6/1997 | |
| DE | 197 16 758 | 10/1998 | |
| DE | 199 10 460 | 9/2000 | |
| DE | 102 47 310 | 4/2004 | |
| DE | 103 05 812 | 9/2004 | |
| DE | 103 07 813 | 9/2004 | |
| DE | 10 2005 046 120 | 3/2007 | |
| DE | 10 2007 009 394 | 8/2008 | |
| EP | 0 177 925 | 4/1986 | |
| EP | 0 314 607 | 5/1989 | |
| EP | 0 627 558 | 12/1994 | |
| EP | 0 735 270 | 10/1996 | |
| EP | 0 819 852 | 1/1998 | |
| EP | 0718957 | 2/1998 | |
| FR | 2 473 912 | 7/1981 | |
| FR | 2 504 206 | 10/1982 | |
| JP | 51-31103 | 8/1949 | |
| JP | 61-9566 | 1/1986 | |
| JP | 61-110877 | 7/1986 | |
| JP | 63257434 | 10/1988 | |
| JP | 213135 | 1/1990 | |
| JP | 387836 | 9/1991 | |
| JP | 06016186 | 1/1994 | |
| JP | 09-014199 | 1/1997 | |
| JP | 10-009135 | 1/1998 | |
| JP | 10317964 | 12/1998 | |
| JP | 11022482 | 1/1999 | |
| JP | 11062607 | 3/1999 | |
| JP | 11270885 | 10/1999 | |
| JP | 2000130800 | 5/2000 | |
| JP | 2003193837 | 7/2003 | |
| JP | 2003-232280 | 8/2003 | |
| JP | 2005306153 | 11/2005 | |
| JP | 2006291744 | 10/2006 | |
| JP | 2007-002713 | 1/2007 | |
| JP | 2008039251 | 2/2008 | |
| WO | 02/23699 | 3/2002 | |
| WO | 2008101594 | 8/2008 | |

* cited by examiner

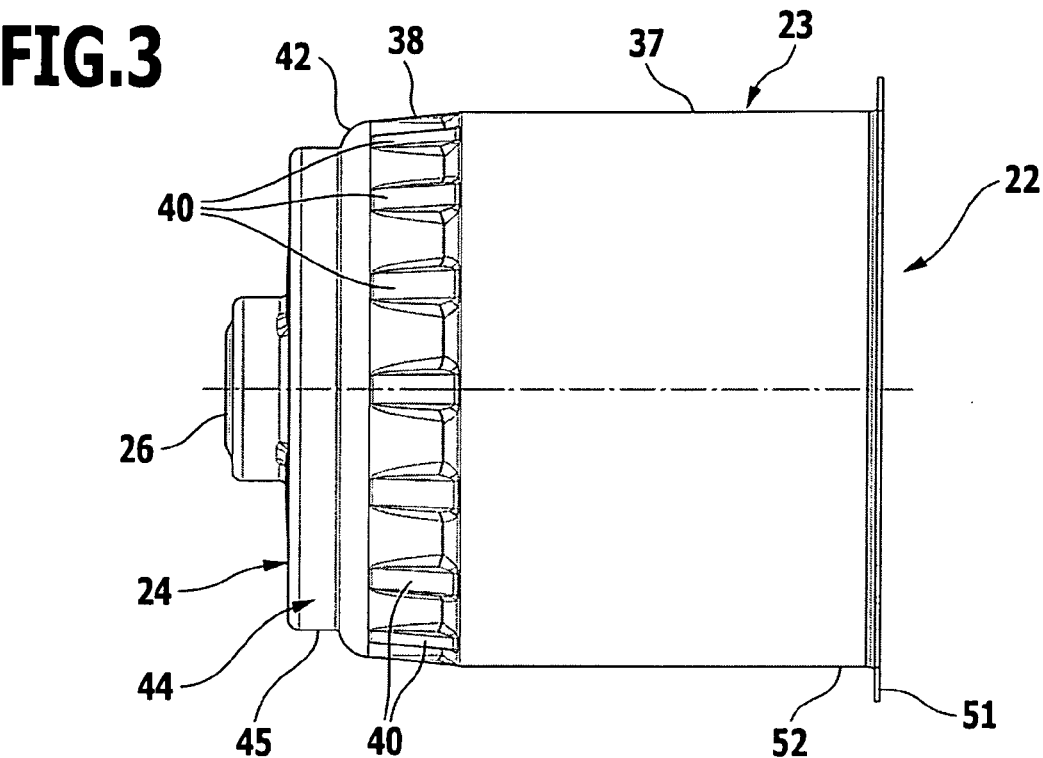
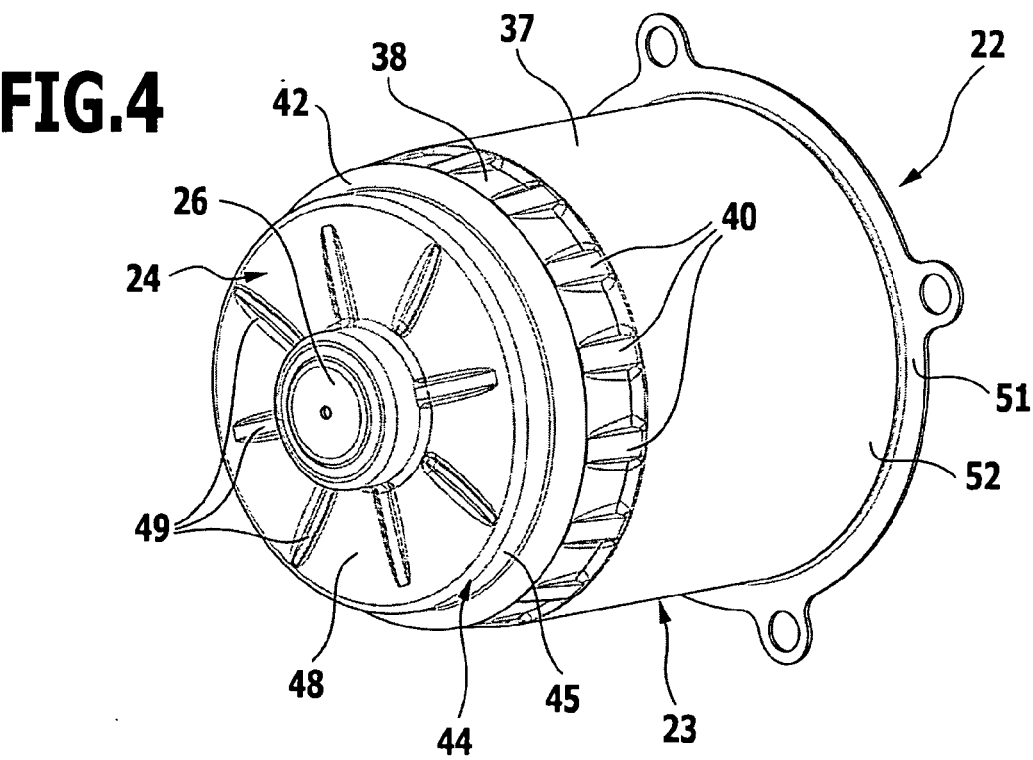

MOTOR PUMP UNIT

This application is a continuation of international application number PCT/EP2010/051100 filed on Jan. 29, 2010 and claims the benefit of German application No. 10 2009 010 461.5 filed Feb. 13, 2009.

The present disclosure relates to the subject matter disclosed in international application number PCT/EP2010/051100 filed on Jan. 29, 2010 and German application No. 10 2009 010 461.5 of Feb. 13, 2009, which are incorporated herein by reference in their entirety and for all purposes.

BACKGROUND OF THE INVENTION

The invention relates to a motor pump unit for a high-pressure cleaning apparatus having a liquid-cooled electric motor and a pump, wherein the electric motor has a cup-shaped motor housing that is surrounded by a cooling housing with an annular space having an annular space inlet and an annular space outlet formed therebetween, and wherein the pump has a suction inlet connected to the annular space outlet for drawing in liquid and a pressure outlet for discharging liquid, and wherein the liquid to be transported by the pump can be supplied to the annular space inlet.

Motor pump units of this type are known from DE 10 2007 009 394 A1. They are used in high-pressure cleaning apparatuses in which a liquid, preferably water, can be pressurized and then discharged via the pressure outlet. The pressure outlet can have connected to it a high-pressure hose with, for example, a spray lance or a spray nozzle at its free end. This provides the possibility of directing a high-pressure liquid jet towards an object in order, for example, to clean the object.

The pump is driven by means of an electric motor which is cooled by the liquid that is supplied to the pump. To this end, the motor housing is surrounded by a cooling housing shaped in a cylindrical shell configuration, wherein an annular space is formed between the motor housing and the cooling housing which can be supplied with liquid via an annular space inlet. The liquid can flow through the annular space and reach the suction inlet of the pump by way of the annular space outlet, so that it can then be pressurized.

In many instances, the pump is connected to a public water supply network. Within the water supply network, the liquid is subject to a delivery pressure of several bars, for example 3 to 10 bar. As a result, the delivery pressure that exists within the water supply network also exists within the annular space. This in turn causes the motor housing to be exposed to considerable pressure, directed radially inward, from the liquid. The motor housing has to withstand this pressure. However, for manufacturing reasons, it should have as small a wall thickness as possible. There is therefore a risk that the motor housing may be damaged by the liquid pressure prevailing in the annular space if the annular space extends over areas of the motor housing that are not supported inside by the stator of the electric motor. This could be counteracted by having the annular space extend over only a partial area of the shell of the motor housing. This, however, would result in a restricted cooling effect.

SUMMARY OF THE INVENTION

In accordance with an embodiment of the invention, a motor pump unit is provided in which the motor housing can have as small a wall thickness as possible and can still be cooled effectively over a large surface area.

In accordance with an embodiment of the invention the motor pump unit comprises a motor housing configured as a one-piece deep-drawn part which in a front shell area contacts stator laminations of the electric motor and in a rear shell area is arranged at a distance from rear coil heads of the stator and in the rear shell area has stiffness-enhancing depressions, wherein both the front and the rear shell areas are surrounded by the annular space.

The motor housing used in accordance with the invention is produced as a one-piece deep-drawn part, i.e. it is formed by a deep-drawing process from a relatively thin sheet metal. It has a shell and a bottom, the shell being surrounded over practically its entire length by the annular space through which the liquid to be pressurized by the pump is passed. In a front shell area, the motor housing contacts stator laminations of the electric motor and is thereby supported in a radial direction. In a rear shell area, however, the motor housing lacks radial support; instead, the motor housing, in the rear shell area, is positioned at a distance from the voltage-carrying rear coil heads of the stator. In this area, the motor housing has stiffness-enhancing depressions. These counteract deformation of the motor housing effectively. The annular space can therefore extend in a longitudinal direction of the motor over the entire shell of the motor housing, so that very good dissipation of heat is ensured without entailing the risk of the motor housing in the rear shell area being deformed by the liquid pressure.

The stiffness-enhancing depressions may, for example, be configured as an annular groove or knurling. It is, however, particularly advantageous for the stiffness-enhancing depressions to be configured in the form of beads. Advantageously, the beads are aligned in a longitudinal direction of the electric motor. Advantageously, they extend in a longitudinal direction over the entire rear shell area of the motor housing, which is arranged at a distance from the rear coil heads of the stator.

It is advantageous for the motor housing to form on the side of the stiffness-enhancing depressions facing away from the pump a sealing face which is sealingly contacted by a sealing ring. The sealing ring delimits the annular space in an axial direction. Therefore, it follows the stiffness-enhancing depressions preferably at a short distance.

It may be provided for the motor housing to have a collar arranged on the side of the depressions facing away from the pump, said collar being aligned concentrically with the motor shaft and forming a sealing face for a sealing ring.

Preferably, the sealing ring contacting the sealing face is radially clamped between the motor housing and the cooling housing. This simplifies the assembly of the motor pump unit. Moreover, by the radial biasing of the sealing ring, manufacturing tolerances of the motor housing and the cooling housing can be compensated in respect of the concentricity thereof.

It is advantageous for the cooling housing to be configured as a plastics part of cylindrical shell configuration which can be slid in an axial direction onto the motor housing and which in a front area facing towards the pump and in a rear area facing away from the pump has cylindrical shell shaped sealing faces aligned concentrically with the motor shaft, each sealing face being contacted by a sealing ring clamped in a radial direction for sealing the annular space. To assemble the motor pump unit, the cooling housing made of a plastics material can be slid onto the motor housing with a front and a rear sealing ring interposed therebetween. An annular space is thereby created along the shell face of the motor housing, said annular space being axially sealed by the two sealing rings. The radial biasing of the sealing rings not only simplifies assembly of the motor pump unit, but also allows manufacturing tolerances of the motor housing and the cooling housing to be compensated in respect of the concentricity thereof, as has been mentioned already.

Advantageously, the cooling housing, in its end area facing away from the pump, comprises an annular projection defining a cylindrical shell shaped sealing face for contacting a sealing ring.

It is particularly advantageous for the sealing face of the projection in a radial direction to be arranged at the same height as the bottom of the stiffness-enhancing depressions.

In a particularly preferred embodiment of the invention, a connecting nipple aligned parallel to the motor shaft is arranged at the annular space inlet and/or at the annular space outlet, said connecting nipple being adapted to be connected in a liquid-tight manner to a cooling passage of a drive housing of the pump when the cooling housing is slid onto the motor housing. Thus, sliding the cooling housing onto the motor housing at the same time establishes a liquid-tight connection between the annular space inlet and/or the annular space outlet and a cooling passage of the drive housing. The provision of the at least one cooling passage makes it possible for the liquid to be pressurized by the pump to be also utilized for direct cooling of the drive housing. The cooling passage can be connected to the annular space inlet or the annular space outlet in a simple manner by sliding the cooling housing in an axial direction onto the motor housing.

It is advantageous for both the annular space inlet and the annular space outlet to be connected to a cooling passage of the drive housing. With such a configuration, the liquid to be transported first flows through a first cooling passage of the drive housing, then enters the annular space surrounding the motor housing via the annular space inlet and passes on to the suction inlet by way of the annular space outlet and the drive housing's second cooling passage adjacent thereto. The suction inlet can be connected to the annular space outlet via a connecting conduit.

The following description of a preferred embodiment of the invention, taken in conjunction with the drawings, serves to explain the invention in greater detail.

BRIEF DESCRIPTION OF THE DRAWINGS

FIG. 3: is a side view of a motor housing of the electric motor of the motor pump unit shown in FIG. 1;
and
FIG. 4: is a perspective view of the motor housing shown in FIG. 3.

DETAILED DESCRIPTION OF THE INVENTION

Figure 1:
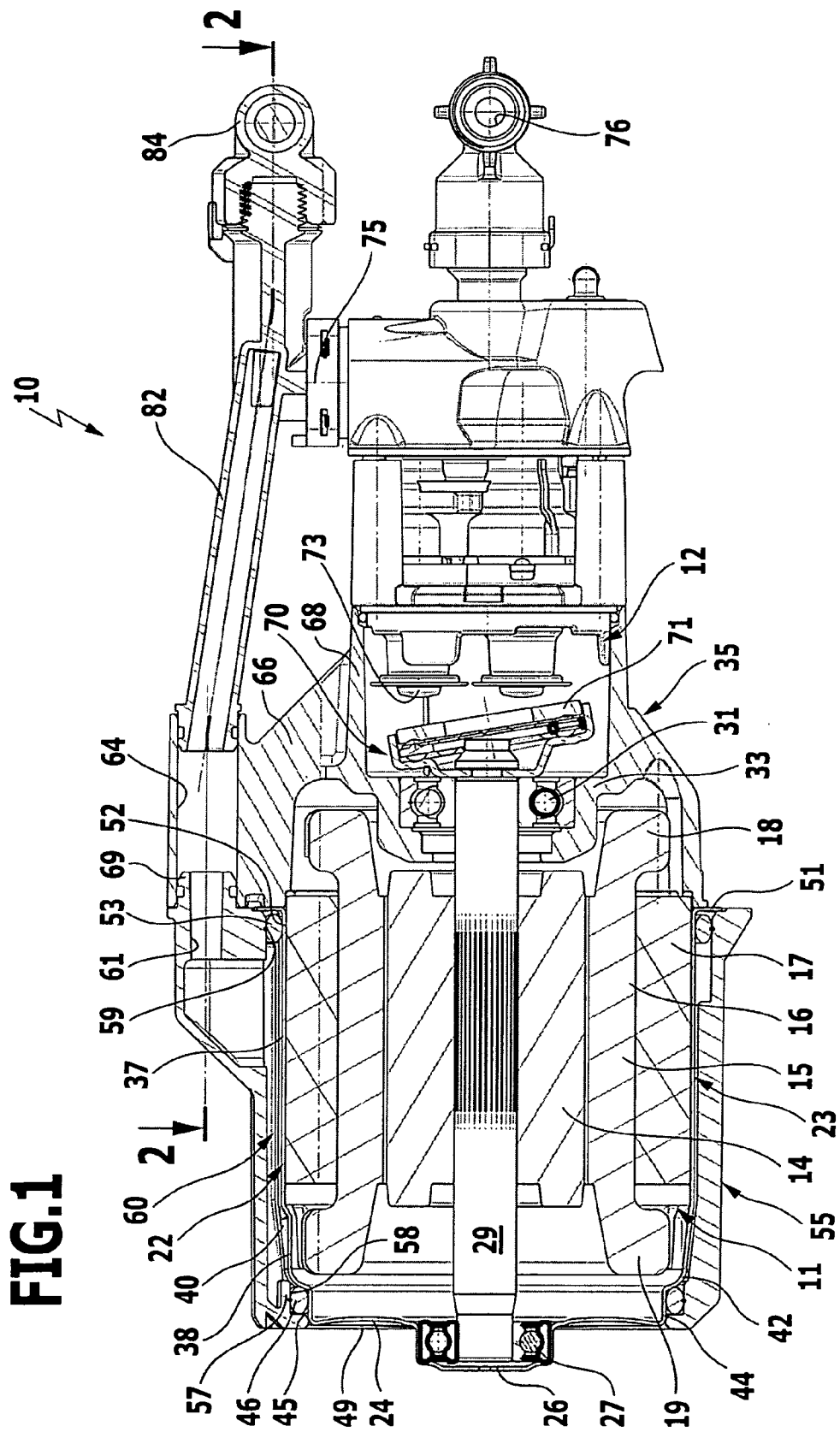
FIG. 1: is a partial sectional view of a motor pump unit.
Figure 2:
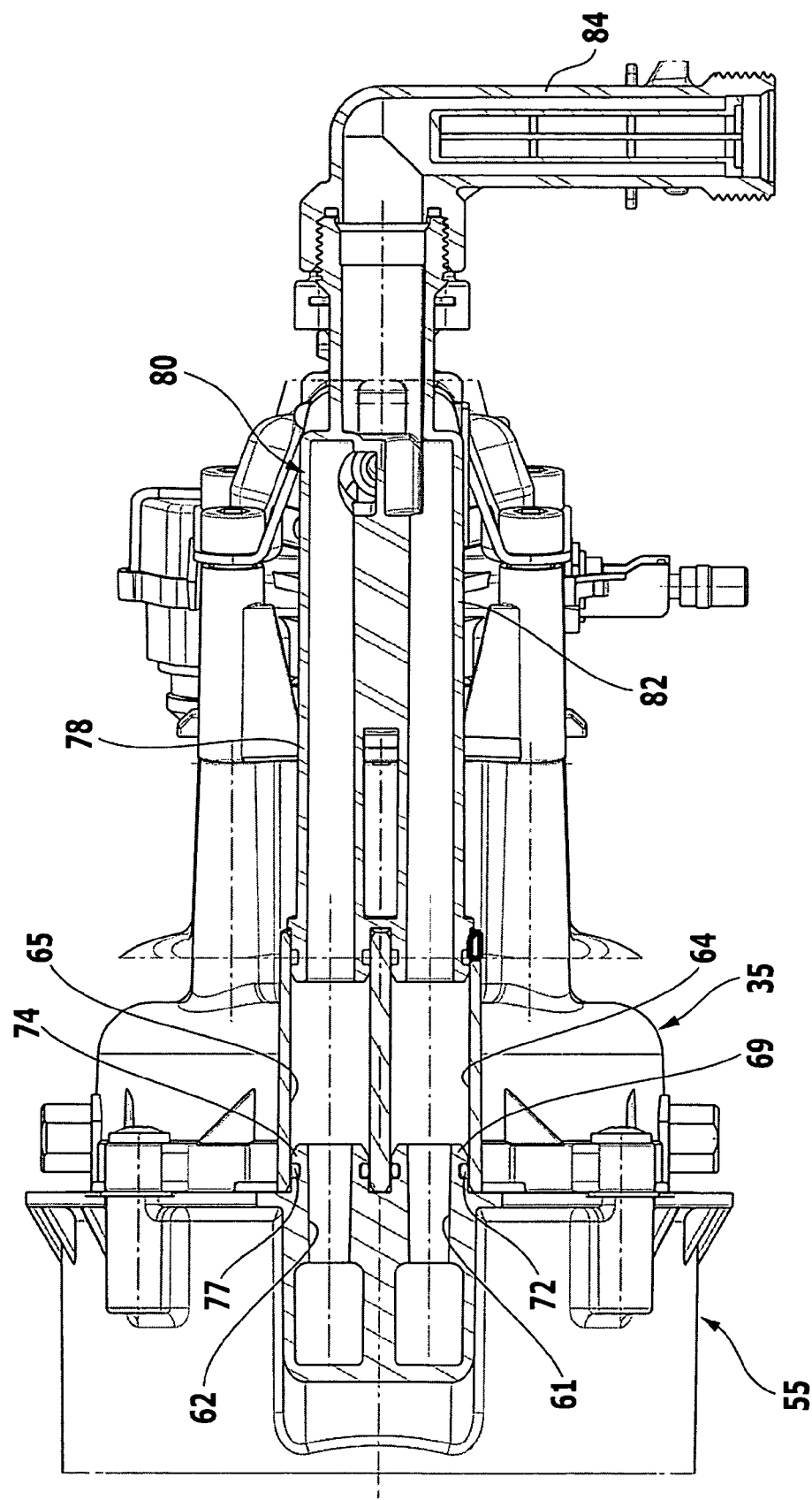
FIG. 2: is a sectional view taken along line 2-2 in FIG. 1.

FIG. 1 is a schematic view illustrating a motor pump unit 10 in accordance with the invention having a liquid-cooled electric motor 11 which is configured as an asynchronous motor, and a pump 12 driven by the electric motor 11. The electric motor 11 has, in a conventional manner, a rotor 14 surrounded by a stator 15. The stator 15 comprises stator windings 16 which are held on stator laminations 17 and form front winding heads 18 facing towards the pump 12 and rear winding heads 19 facing away from the pump 12.

The electric motor 11 has a cup-shaped motor housing 22 which is formed by a deep-drawing process from a sheet metal. It comprises a cylindrical shell 23 and a bottom 24. The bottom 24 has a receiving portion 26 centrally and integrally formed therein which receives a first bearing 27 of a motor shaft 29. A second bearing 31 of the motor shaft 29 is held at a bearing shield 33 which is integrally formed on a drive housing 35 of the pump 12.

With a front shell section 37, the shell 23 of the motor housing 22 contacts the stator laminations 17 directly, and in a rear shell section 38, the motor housing 22 surrounds the rear winding heads 19 of the stator 15 at a radial distance therefrom. In this area, the motor housing 22 has a multiplicity of stiffness-enhancing depressions in the form of longitudinal beads 40 which are arranged at a uniform distance from one another in the circumferential direction. The longitudinal beads 40 extend in the direction facing away from the pump to an arcuate transition area 42 which is followed by a collar 44 aligned concentrically with the motor shaft 29. Said collar forms a motor side, cylindrical shell shaped rear sealing face 45 which is contacted by a rear sealing ring 46. The motor side rear sealing face 45 is followed by the bottom 24. The bottom 24, within an annular bottom section 48 surrounding the central receiving portion 26, has a multiplicity of radially extending grooves 49 which increase the stiffness of the bottom 24 of the motor housing 22.

At its face end facing towards the pump 12, the motor housing 22 has an outward-projecting annular flange 51 which, on the side facing away from the pump 12, is followed by a motor side, cylindrical shell shaped front sealing face 52 which is contacted by a front sealing ring 53.

The motor housing 22 is surrounded in a circumferential direction by a cooling housing 55 made of a plastics material, said cooling housing being of cylindrical shell shaped configuration and slid in the axial direction onto the motor housing 22. A projection 57 of the cooling housing 55 that is aligned concentrically with the collar 44 defines a rear sealing face 58 of the cooling housing 55 corresponding to the rear sealing face 45 of the motor housing 22. The rear sealing ring 46 is radially clamped between the rear sealing faces 45 and 58. A cylindrical shell shaped front sealing face 59 of the cooling housing 55 surrounds the front sealing face 52 of the motor housing 22. The front sealing ring 53 is radially clamped between the front sealing faces 52 and 59. An annular space 60 surrounding the motor housing 22 in a circumferential direction and to which liquid can be supplied by way of an annular space inlet 61 and from which the liquid can be discharged by way of an annular space outlet 62 extends in the area between the rear sealing ring 46 and the front sealing ring 53.

Arranged upstream of the annular space inlet 61 is a first cooling passage 64 of the drive housing 35, and on the downstream side the annular space outlet 62 is followed by a second cooling passage 65 of the drive housing 35.

The two cooling passages 64 and 65 are each connected in one piece to a base body 68 of the drive housing 35 via a heat-conductive rib 66. This provides particularly good conduction of heat from the base body 68 to the cooling passages 64, 65.

The base body 68 surrounds a swash drive 70 held on the motor shaft 29 and having a swash plate 71. Furthermore, the base body 68 surrounds pistons 73 of the pump 12 contacting the swash plate 71 at a face end thereof. For clarity, the pistons 73 have been shown as being arranged at a distance from the swash plate 71 in the drawing but in fact they contact the swash plate 71 and are driven for reciprocating movement thereby. In each case, the ends of the pistons 73 facing away from the swash plate 71 extend into a pump space in a conventional manner, so that, owing to the reciprocating movement of the pistons, liquid can be drawn from a suction inlet 75 of the pump 12 into the pump space and can be discharged therefrom via a pressure outlet 76 of the pump 12 after a compression stroke of the pistons 73.

The suction inlet 75 is connected to the second cooling passage 65 of the drive housing 35 via a connecting conduit 78 of a conduit arrangement 80. In addition to the connecting conduit 78, the conduit arrangement 80 further has a feed conduit 82 which can be supplied with liquid via a pipe connection piece 84. The liquid to be pressurized by the pump 12 first flows through the pipe connection piece 84 and the feed conduit 82 as well as the first cooling passage 64, then enters the annular space 60 via the annular space inlet 61, flows past the motor housing 22 within the annular space 60 and enters the second cooling passage 65 via the annular space outlet 62. From the second cooling passage 65, the liquid is supplied via the connecting conduit 78 to the suction inlet 75, so that it can then be pressurized by the pump 12.

The liquid-tight connection between the annular space inlet 61 and the first cooling passage 64 is realized via a connecting nipple 69 aligned parallel to the first cooling passage 64 and integrally formed on the annular space inlet 61, said connecting nipple extending into the first cooling passage 64 when the cooling housing 55 is slid onto the motor housing 22 and being surrounded by a sealing ring 72. In a corresponding manner, the liquid-tight connection between the annular space outlet 62 and the second cooling passage 65 is realized by means of a connecting nipple 74 integrally formed on the annular space outlet 62, said connecting nipple extending into the second cooling passage 65 and being surrounded by a sealing ring 77.

The liquid flowing through the cooling passages 64 and 65 as well as the annular space 60 absorbs the waste heat from the drive housing 35 and the motor housing 22. The drive housing 35 and the motor housing 22 are thus cooled effectively.

In many instances, the pipe connection piece 84 is connected to a pressurized water supply network. As a result, the liquid entering the annular space 60 is already pressurized to several bars, for example, to a pressure of 3 to 10 bar. The shell 23 of the motor housing 22 that is surrounded by the annular space 60 over virtually its entire length is therefore subject to a considerable pressure load. In the area of the front shell section 37, the cylindrical shell 23 contacts the stator laminations 17 directly and is reliably supported thereby. In the area of the rear winding heads 19, however, the cylindrical shell 23 has no such support. This is why the stiffness-enhancing longitudinal beads 40 are integrally formed in the rear shell section 38 of the motor housing 22. It has been shown that this enables the motor housing 22 to withstand reliably a pressure load customary for public water supply networks, even for prolonged Periods of use of the motor pump unit 10. The annular space 60 can therefore extend over the entire length of the shell 23 of the motor housing 22 instead of just over the front shell section 37, which is supported by the stator laminations 17. The annular space 60, thus enlarged, results in particularly effective cooling of the electric motor 11. Since, furthermore, the liquid to be transported also provides cooling for the drive housing 35 and, with this, in particular for the bearing shield 33 and the swash drive 70, the motor pump unit 10 in accordance with the invention is distinguished by a particularly effective cooling effect. Even if the motor pump unit 10 is surrounded by a housing having no inlet and outlet air openings, there is no risk of overheating. The motor pump unit 10 is thus particularly suited for use in splash-proof housings for high-pressure cleaning apparatuses.

The invention claimed is:

1. Motor pump unit for a high-pressure cleaning apparatus, comprising:
   a liquid-cooled electric motor and a pump, wherein:
   the electric motor has a cup-shaped motor housing that is surrounded by a cooling housing with an annular space having an annular space inlet and an annular space outlet formed therebetween,
   the pump has a suction inlet connected to the annular space outlet for drawing in liquid and a pressure outlet for discharging the liquid,
   the liquid to be transported by the pump is suppliable to the annular space inlet,
   the motor housing is monolithically formed as a one-piece deep-drawn part comprising a cylindrical shell and a bottom, the cylindrical shell comprising a front shell area which contacts stator laminations of the electric motor and a rear shell area which is arranged at a distance from rear coil heads of the stator, the rear shell area having stiffness-enhancing depressions,
   the front and the rear shell areas are surrounded by the annular space,
   the motor housing has a collar arranged on a side of the depressions that faces away from the pump, said collar being aligned concentrically with a motor shaft and forming a sealing face for a sealing ring.

2. Motor pump unit in accordance with claim 1, wherein the stiffness-enhancing depressions are configured in a form of beads aligned in a longitudinal direction of the electric motor.

3. Motor pump unit in accordance with claim 1, wherein the cooling housing is configured as a plastic part of cylindrical shell configuration which is adapted to be slid onto the motor housing in an axial direction and which in a front area facing towards the pump and in a rear area facing away from the pump has sealing faces aligned concentrically with a motor shaft, the front and rear sealing faces being contacted respectively by front and rear sealing rings clamped in a radial direction for sealing the annular space.

4. Motor pump unit in accordance with claim 3, wherein the cooling housing, in an end area facing away from the pump, has an annular projection defining a cylindrical shell shaped sealing face for contacting the rear sealing ring.

5. Motor pump unit in accordance with claim 4, wherein the sealing face of the annular projection in a radial direction is arranged at a same height as a bottom of the depressions.

6. Motor pump unit in accordance with claim 3, wherein a connecting nipple aligned parallel to the motor shaft is arranged at the annular space inlet and/or at the annular space outlet, said connecting nipple being connectable in a liquid-tight manner to a cooling passage of a drive housing of the pump.

* * * * *